United States Patent

Ghezzo et al.

Patent Number: 5,367,584
Date of Patent: Nov. 22, 1994

[54] INTEGRATED MICROELECTROMECHANICAL POLYMERIC PHOTONIC SWITCHING ARRAYS

[75] Inventors: Mario Ghezzo, Ballston Lake, N.Y.; Christopher P. Yakymyshyn, Raleigh, N.C.; Anil R. Duggal, Schenectady, N.Y.

[73] Assignee: General Electric Company, Schenectady, N.Y.

[21] Appl. No.: 144,119

[22] Filed: Oct. 27, 1993

[51] Int. Cl.⁵ .................................. G02B 6/30
[52] U.S. Cl. ................................ 385/17; 385/19
[58] Field of Search ................. 385/13, 14, 17, 19, 385/42, 129, 130

[56] References Cited

U.S. PATENT DOCUMENTS

| | | | |
|---|---|---|---|
| 3,754,988 | 8/1973 | Barnes | 385/17 X |
| 4,681,397 | 7/1987 | Bhatt | 385/17 |
| 4,773,721 | 9/1988 | Erman et al. | 385/17 |
| 4,818,050 | 4/1989 | Duthie | 385/17 |
| 5,093,875 | 3/1992 | Ogura et al. | 385/17 |
| 5,148,507 | 9/1992 | Tanisawa | 385/16 X |
| 5,204,921 | 4/1993 | Kanai et al. | 385/19 X |

OTHER PUBLICATIONS

"Waveguide Electrooptic Switch Arrays" by Rod C. Alferness, IEEE Journal on Selected Areas In Communications, vol. 6, No. 7, Aug. 1988, pp. 1117–1130. (no date).

"A Silicon-Based Moving-Mirror Optical Switch", by Mino F. Dautartas, et al, IEEE Journal of Lightwave Technology, vol. 10, No. 8, Aug. 1992, pp. 1078–1085. (no date).

"A Plastic Optical Fiber Based Photonic Switch", by G. J. Grimes, et al, SPIE vol. 1592 Plastic Optical Fibers (1991), pp. 139–149. (no date).

"Fiber Optic Sheet Formation by Selective Photopolymerization", by Takashi Kurokawa, et al, Applied Optics, vol. 17, No. 4, Feb. 1978, pp. 646–650. (no date).

"Demonstration of an Integrated, Active 4×4 Photonic Crossbar", IEEE Photonics Technology Letters, vol. 4, No. 10, Oct. 1992, pp. 1139–1141. (no date).

"Deformable Grating Optical Modulator", by O. Solgaard, et al, Optics Letters, vol. 17, No. 9, May 1, 1992, pp. 688–690.

"Electromechanical Optical Switching and Modulation in Micromachined Silicon-On-insulator Waveguides", by R. Watts, et al, 1991 IEEE, pp. 62–63. (no date).

*Primary Examiner*—Akm E. Ullah
*Attorney, Agent, or Firm*—Ann M. Kratz; Marvin Snyder

[57] ABSTRACT

A microelectromechanical photonic switching array comprises a plurality of first waveguides and a plurality of second waveguides. Insulative cladding is situated between the first and second waveguides. Each of the first waveguides is positioned with predetermined first waveguide portions on one side of at least one opening, and each of the second waveguides is positioned with predetermined second waveguide portions substantially parallel to respective ones of the predetermined first waveguide portions on an opposing side of said opening. A selected one of the predetermined second waveguide portions is capable of being moved closer and coupling light to a respective one of the predetermined first waveguide portions in response to either an electrostatic or piezoelectric signal. Alternatively, the first and second waveguides are co-planar and light is coupled from a predetermined first waveguide to a predetermined second waveguide by using a movable waveguide coupler.

21 Claims, 5 Drawing Sheets

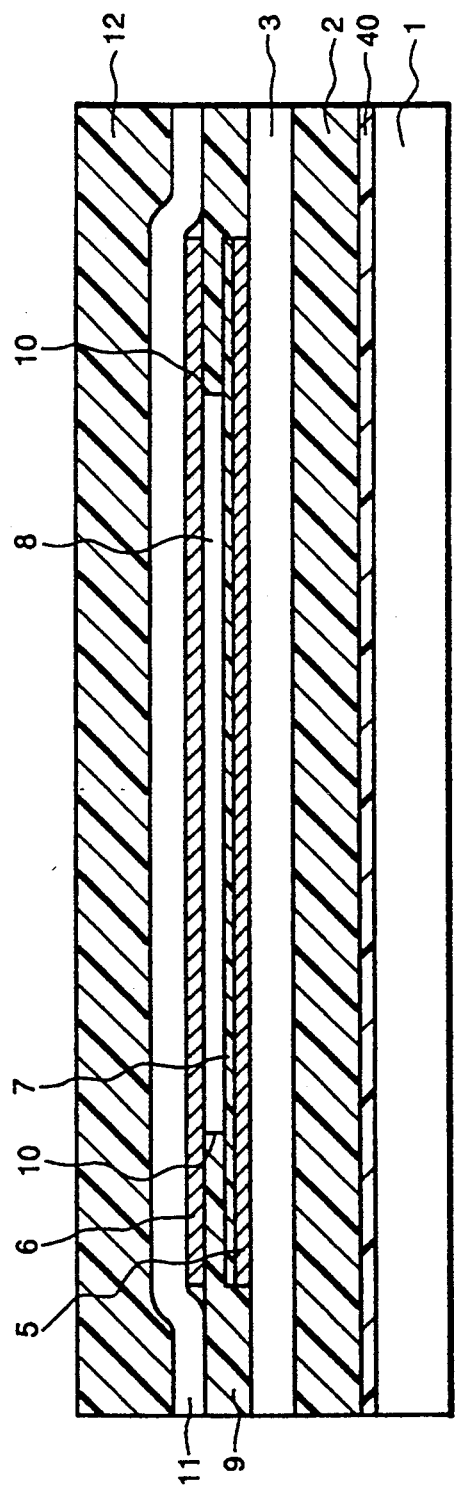
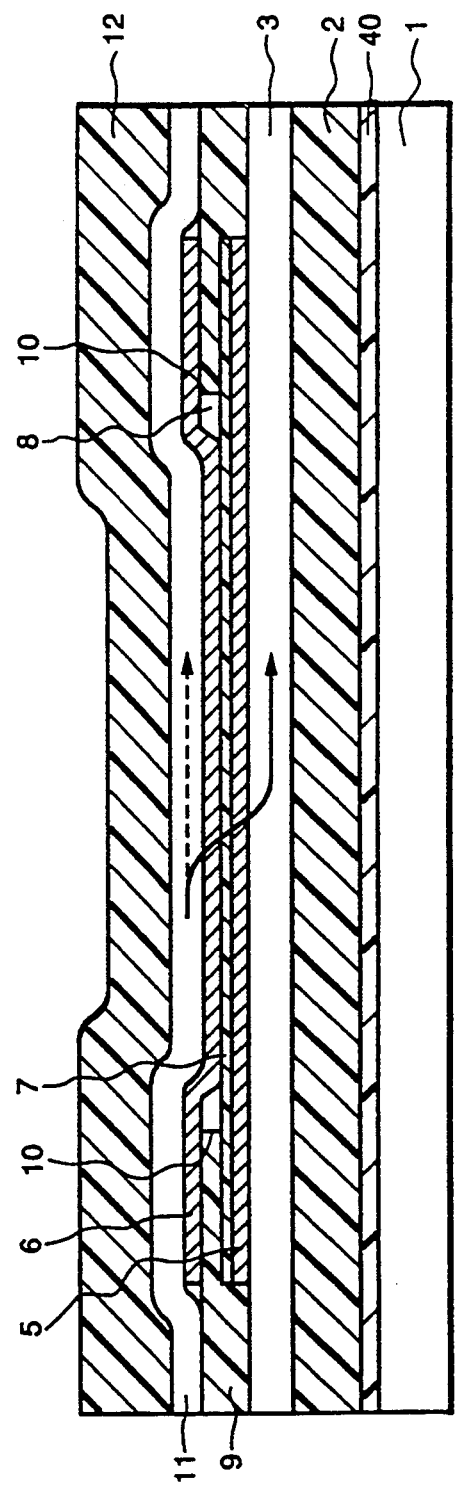
FIG. 1a
FIG. 1b

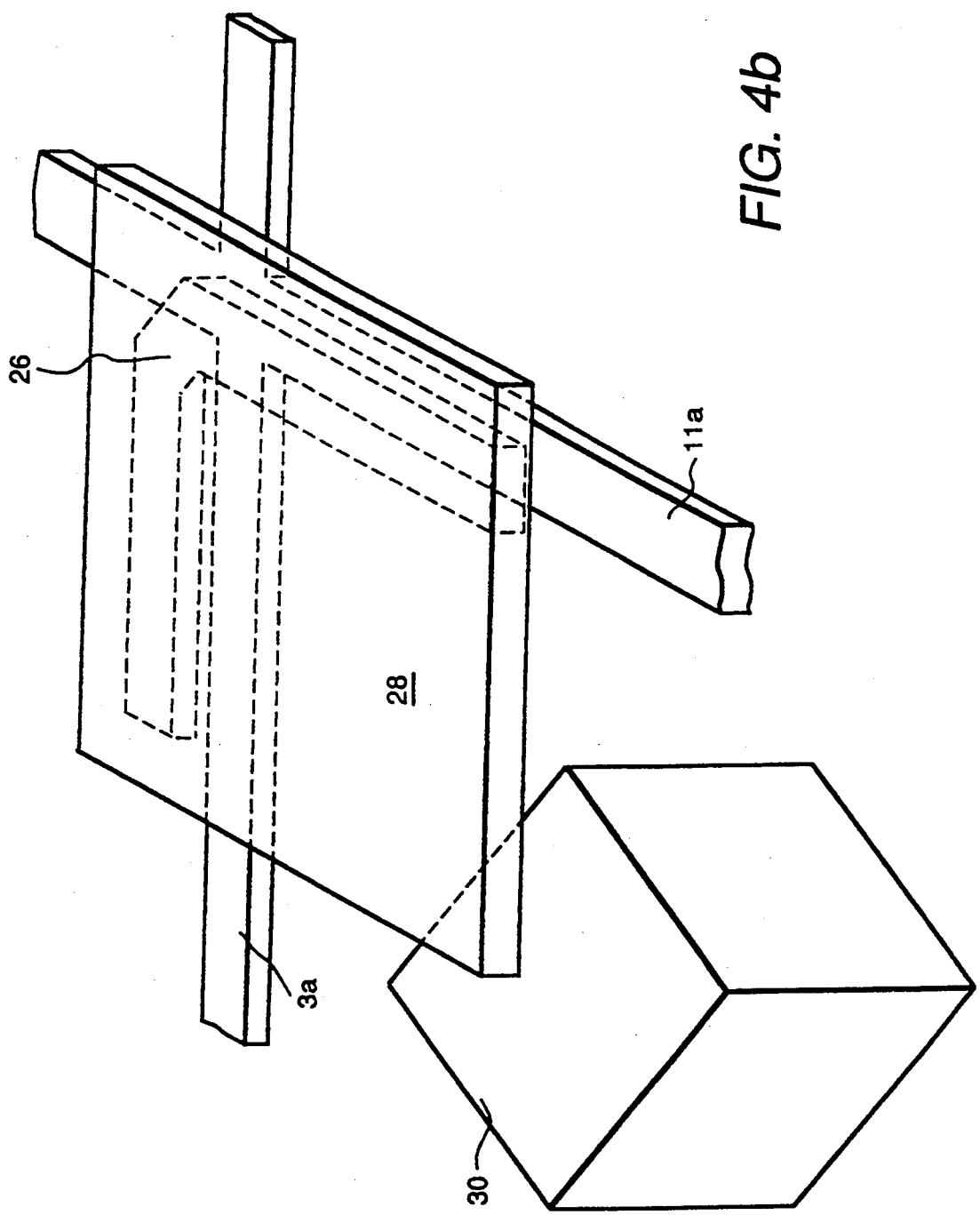

INTEGRATED MICROELECTROMECHANICAL POLYMERIC PHOTONIC SWITCHING ARRAYS

CROSS-REFERENCE TO RELATED APPLICATION

This application is related to the following co-pending application which is commonly assigned and is incorporated herein by reference: Ghezzo et al. "Microelectromechanical Photonic Switch", Ser. No. 08/144,165 now pending. filed concurrently herewith.

BACKGROUND OF THE INVENTION

1. Field of the Invention

This invention relates generally to photonic switching arrays, and, more particularly, to a switching array based on microelectromechanical motion of overlapping polymer waveguides.

2. Description of the Related Art

One conventional photonic switch uses the Mach-Zehnder device architecture with non-linear optical crystals. Although eight-by-eight arrays have been fabricated, this type of switch is expensive to manufacture and difficult to fit on standard electro-optic packages. Commercially available non-linear optical crystal switches that fit on a single substrate are limited to two-by-two arrays. A larger array is yield-limited by its size, which is determined by the electro-optic coefficient of the non-linear crystal, usually $LiNbO_3$, and by the applied voltage, which must comply with the material dielectric strength.

Another method of photonic switching is to convert the optical signal to an electrical signal, reconfigure the input-to-output channel assignment electronically, and convert the electrical signal back to an optical signal. This complicated procedure adds significant overhead to the signal propagation introduced by the decoder and modulator circuitry, thus increasing the time delay and the power consumption. This method is also limited by the bandwidth restrictions of the opto-electronic electronic converter which downgrade the optical network capabilities.

Electromechanical deflection of reflective surfaces has been used for waveguide photonic switching by means of microcantilevers or microbridges, as described in R. Watts et al., "Electromechanical Optical Switching and Modulation in Micromachined Silicon-on-Insulator Waveguides," 1991 IEEE International SOI (silicon-on-insulator) Conference Proceedings, pp. 62–63. A voltage supplies electrostatic attraction resulting in a deflection of the microcantilever or microbridge. When this technique is used in free space, alignment and vibration problems can occur.

Micromachining has recently been used for fabrication of diffraction gratings for spectral analysis and optical modulator switches because of the high resolution sculpting capability of this technique, as described in O. Solgaard et al., "Deformable grating optical modulator," Optics Letters, vol. 17, no. 9, 688–90 (May 1, 1992). Other approaches include a monolithic four-by-four photonic crossbar switch that has been fabricated for avionic systems using rib waveguides with etched facets and turning mirrors, and a multimode two-by-two optical switch in which micromachined pivoting silicon moving mirrors selectively direct optical beams from input fibers to output fibers. Vibration and alignment difficulties reduce the effectiveness of these techniques.

Polymeric waveguide technology has been used with ferroelectric liquid crystals to develop a six-by-six matrix switching array and provide guided wave connectivity to a multi-element spatial light modulator. The maximum operating temperature of this type of switch is about 60° C., however, which is too low for aerospace, military, and automotive applications.

Aforementioned Ghezzo et al., Ser. No. 08/144,165, now pending discloses a switch which uses microelectromechanical motion of overlapping polymer waveguides. The principle of operation is based on modulation of optical energy transfer between overlapping polyimide waveguides which determines whether the incoming light remains in the initial waveguide or is partially transferred to the adjacent waveguide. This transfer depends on the mutual separation between waveguides, which is controlled by electrostatic or piezoelectric actuation.

SUMMARY OF THE INVENTION

Accordingly, one object of the invention is to provide a photonic switching array having a high tolerance to a wide range of ambient operating conditions.

Briefly, in accordance with one embodiment of the invention, a microelectromechanical photonic switching array comprises a plurality of first waveguides and a plurality of second waveguides. Insulative cladding is situated between the first and second pluralities of waveguides. The insulative cladding has at least one patterned opening. Each one of the first waveguides is positioned such that predetermined first waveguide portions are on one side of the opening, and each one of the second waveguides is positioned such that predetermined second waveguide portions are substantially parallel to respective predetermined first waveguide portions and situated on an opposing side of the opening. Means are provided for moving a selected one of the predetermined second waveguide portions closer to a respective one of the predetermined first waveguide portions in response to an actuation signal.

In accordance with another embodiment of the invention, a microelectromechanical photonic switching array comprises a plurality of first waveguides and a plurality of second waveguides with each of the second waveguides intersecting respective portions of each of the first waveguides at a respective intersection point. A plurality of waveguide couplers each have one waveguide coupler portion situated substantially parallel to a first coupler portion of a respective one of the first waveguides and another waveguide coupler portion situated substantially parallel to a second coupler portion of a respective one of the second waveguides. The first and second coupler portions form cross-over portions. Distancing means, which are provided for keeping the waveguide couplers and the first and second pluralities of waveguides a desired distance apart, have at least one patterned opening. Each one of the cross-over portions is situated on one side of the opening and each respective one of the waveguide couplers is situated on an opposing side of the opening. Means are provided for moving a predetermined waveguide coupler closer to a respective intersection point in response to an actuation signal.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

FIGS. 1a and 1b are cross-sectional side views of one embodiment of a photonic switch in an unactuated state and an actuated state, respectively;

FIG. 4b is an isometric view of the switching array shown in FIG. 4a.

DETAILED DESCRIPTION OF PREFERRED EMBODIMENTS OF THE INVENTION

Figure 2A:
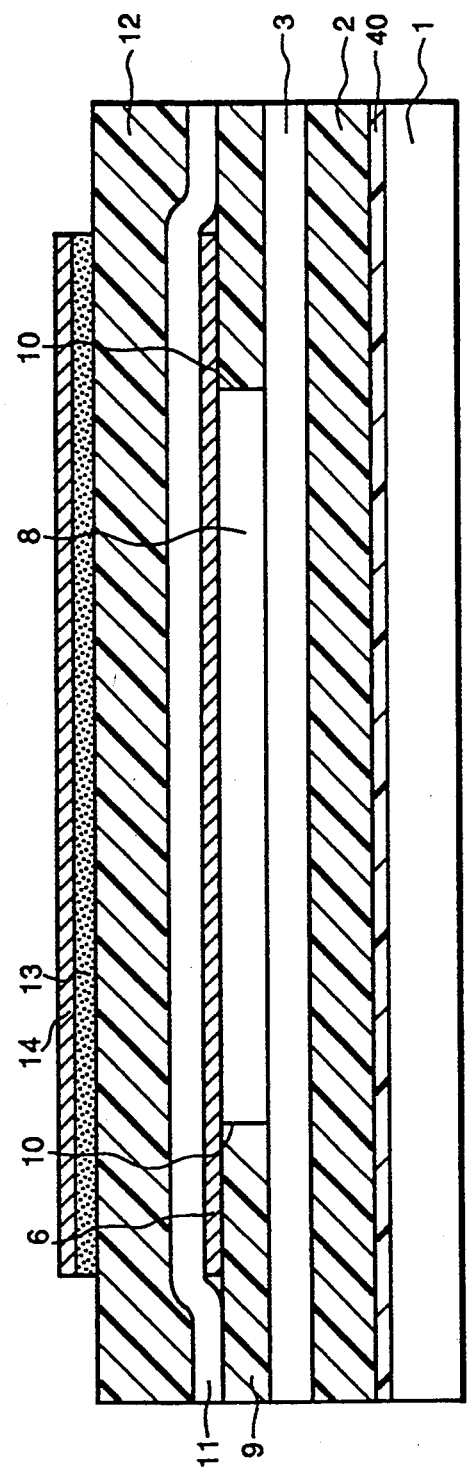
FIGS. 2a and 2b are cross-sectional side views of another embodiment of a photonic switch in an unactuated state and an actuated state, respectively.

FIGS. 1a and 1b are cross-sectional views of an embodiment of an electrostatic switch used in the arrays (shown in FIGS. 3a-4b) of the present invention in unactuated and actuated states, respectively. Aforementioned, Ghezzo et al., Ser. No. 08/144,165, now pending, describes several embodiments, for fabricating an electrostatic switch. A substrate 1, which is preferably a portion of a silicon wafer about 500 $\mu$m thick passivated with a 5000 Å thick silicon dioxide layer 40, provides mechanical support and allows integration of the switch. Using a silicon wafer as the substrate allows for convenient integration of switch electrodes 5 and 6 to other integrated circuitry which is easily fabricated on the semiconductor substrate. Substrate 1 can include similar switches, for example in an array geometry, and can further include electronic controls fabricated in the silicon prior to the photonic switch fabrication.

A first cladding layer 2, about 10 $\mu$m thick is sputtered or laminated over the silicon dioxide-covered substrate. A first waveguide 3 having a higher refractive index than the refractive index of the first cladding layer is applied and patterned over first cladding layer 2. First waveguide 3 is about 10 $\mu$m thick and is designed for multi-mode light transmission.

Both first cladding layer 2 and first waveguide 3 preferably include polyimide materials which are chosen according to their refractive indices and optical transmissivities per unit length. Waveguides need a higher refractive index than cladding to generate total internal reflections at the waveguide boundaries and thus eliminate external light loss. The refractive index change is easily accomplished by a slight modification of the polyimide composition. For example decreasing the fluorine content in a polyimide results in a higher index of refraction.

A first electrode 5 is formed over portions of first waveguide 3 and over adjacent regions of first cladding layer 2. The first electrode is about 400 Å thick and preferably comprises an at least partially transparent material such as antimony tin oxide (ATO) or indium tin oxide (ITO). A thin, at least partially transparent, insulator layer 7 is applied over first electrode 5 for electrical isolation during mechanical contact between first electrode 5 and a second electrode 6. In one embodiment, thin insulator layer 7 comprises silicon dioxide having a thickness of approximately 400–1000 Å. The thin insulator layer is also useful as an etch stop during formation of an air gap 8.

An insulative cladding layer 9 is next applied over insulator layer 7 and first waveguide 3. In this embodiment, the cladding material may comprise a polyimide having a thickness of 15 $\mu$m, for example.

A well 10, which provides an air gap 8, is formed in insulative cladding layer 9 preferably by using excimer laser ablation. The well is then refilled with a self-aligned sacrificial layer (not shown) of electroplated copper, for example. Ghezzo et al., "Micromechanical Moving Structures Including Multiple Contact Switching System, and Micromachining Methods. Therefor," U.S. application Ser. No. 08/000,172 now pending filed Jan. 4, 1993, discloses a method of applying a sacrificial layer of copper and is herein incorporated by reference.

Second electrode 6 is formed over insulative cladding layer 9 and the sacrificial layer by film deposition and patterning. In one embodiment, the second electrode comprises ITO or ATO having a thickness of 400 Å. The first and second electrodes, as well as insulator layer 7, must be at least partially transparent because they are, in this embodiment, positioned between the waveguides to reduce their maximum separation and consequently increase the electrostatic force. Transparency is required to allow light transfer between the waveguides when the electrodes are in mechanical contact.

A second waveguide 11 is formed over second electrode 6 by film deposition and patterning. The second waveguide may comprise a polyimide with a similar index of refraction as first waveguide 3 and a thickness of 10 $\mu$m. The second waveguide is positioned so that a portion is on one side of gap 8, while a portion of the first waveguide is situated on an opposite side of gap 8. The first and second waveguide portions on opposite sides of gap 8 are substantially parallel in that at least one of the two waveguides is movable in the direction of the other waveguide and capable of transferring light.

Neither second electrode 6 nor second waveguide 11 completely covers the sacrificial layer (not shown) which fills well 10. After the second waveguide is applied, the sacrificial layer is laterally removed by applying a selective etch which etches the sacrificial layer but not the electrodes or waveguides, thereby forming the air gap. The use of a sacrificial layer, although preferred, is not required for this invention. Any method of applying the second electrode over a selected portion of insulative cladding 9 and well 10 which retains the spatial integrity of an opening in the well is appropriate.

Well 10 is preferably not any thicker than required to isolate light in an unactuated state and provide adequate light transfer in an actuated state because waveguide motion is preferably limited to several micrometers in order to use electrostatic actuation voltages compatible with conventional integrated circuit technology. Additionally, limiting the deflection distance of the second waveguide leads to short mechanical switching time (preferably less than 100 $\mu$sec).

A second cladding layer 12, formed by lamination or spin coating, for example, completes the switch structure by sealing second waveguide 11 with a polyimide of a lower refractive index. Second cladding layer 12 may comprise a polyimide having a thickness of 10–15 μm, for example. Each of the materials used in the photonic switch must be stable at the operating temperatures of the device at which the switch will be used. Typically the ambient temperatures range from −55° C. to 125° C.

When the voltage between the first and second electrodes is zero, the first and second waveguides are separated by air gap 8 and by insulative cladding 9, leaving them optically and mechanically isolated. In this position the structure is in equilibrium, and thus can remain in equilibrium indefinitely without a holding force. When voltage is applied across the first and second electrodes, second waveguide 11 is pulled downwards electrostatically by the mutual attraction of electrodes 5 and 6 towards first waveguide 3, as shown in FIG. 1b, making mechanical contact through the second electrode and insulator layer 7 covering the first electrode over most of the air gap length. Hence the evanescent wave of the light-carrying waveguide penetrates into the adjacent waveguide, creating a partial optical energy transfer.

Although the switch is shown in this embodiment as being formed and positioned in a vertical orientation, it matters neither how the switch is manufactured nor whether the orientation of the switch in a device is vertical or horizontal. Because the mass of the switch is small, gravity does not have much effect on electrode motion, and one or both electrodes (and thus both waveguides) tend to draw together in response to an electrostatic force no matter what the orientation of the switch.

Many modifications can be made to the embodiments discussed thus far. For example, instead of first and second electrodes 5 and 6, respectively, being applied over or otherwise touching first and second waveguides 3 and 11, respectively, the electrodes can be laterally situated on opposite sides of respective waveguides and not come between a respective waveguide and air gap 8. Several advantages of such embodiment are that the waveguides can come into actual mechanical contact and that the electrodes do not need to be transparent.

Figure 2B:
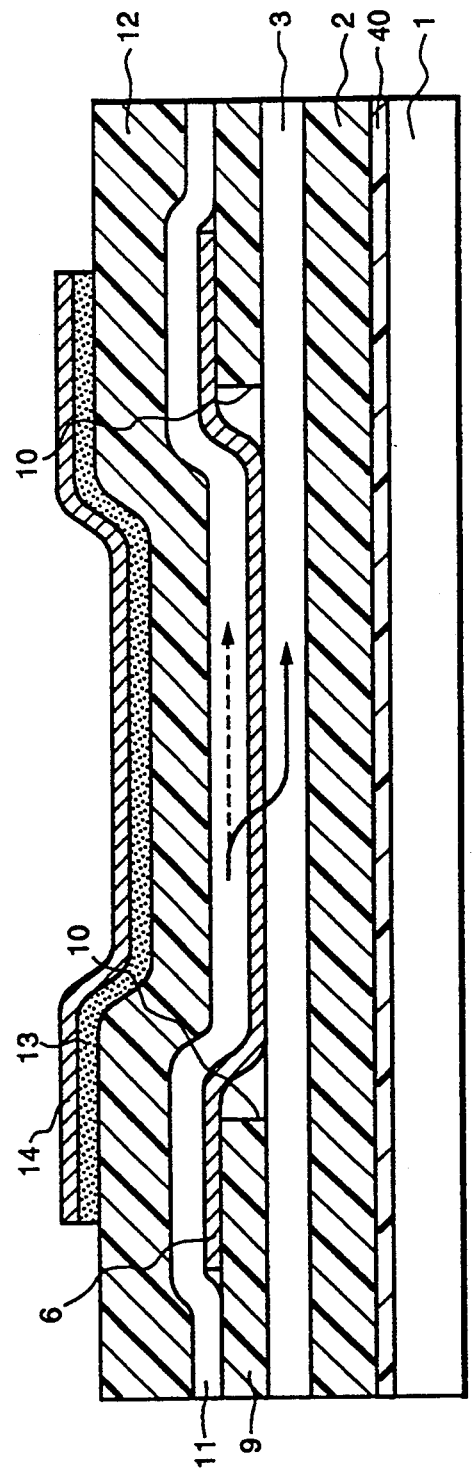

FIGS. 2a and 2b are cross-sectional views of an embodiment of a piezoelectric switch usable in an array (shown in FIGS. 3a–4b) of the present invention in an unactuated state and an actuated state, respectively. This embodiment differs from that of FIGS. 1a–1b in that one of the electrodes, a first piezoelectric electrode 14, is situated over a piezoelectric strip line 13 and second cladding layer 12 rather than between first waveguide 3 and insulative cladding layer 9, as shown for first electrode 5 in FIG. 1a.

Piezoelectric strip line 13, which is preferably 1–2 μm thick, changes length in response to a perpendicularly directed electric field. Piezoelectric strip line 13 must overlie second cladding layer 12 to produce a lateral stress between these layers and consequently bend the composite beam to relieve this stress, thereby generating a vertical deflection. To apply the electric field across the piezoelectric strip line, the electrodes must be positioned on opposite sides of the strip line. Since first piezoelectric electrode 14 is not between the optically active layers, the first piezoelectric layer does not need to be transparent and can include materials such as aluminum, copper, gold, platinum, or chromium, for example. In one embodiment, the piezoelectric electrode has a thickness of about 1000 Å. Piezoelectric strip line 13 can be patterned from a deposited or sputtered layer of gelatin solution containing a piezoelectric material such as lead zirconate titanate (PZT), for example, which has a large transversal piezoelectric coefficient.

Figure 3A:
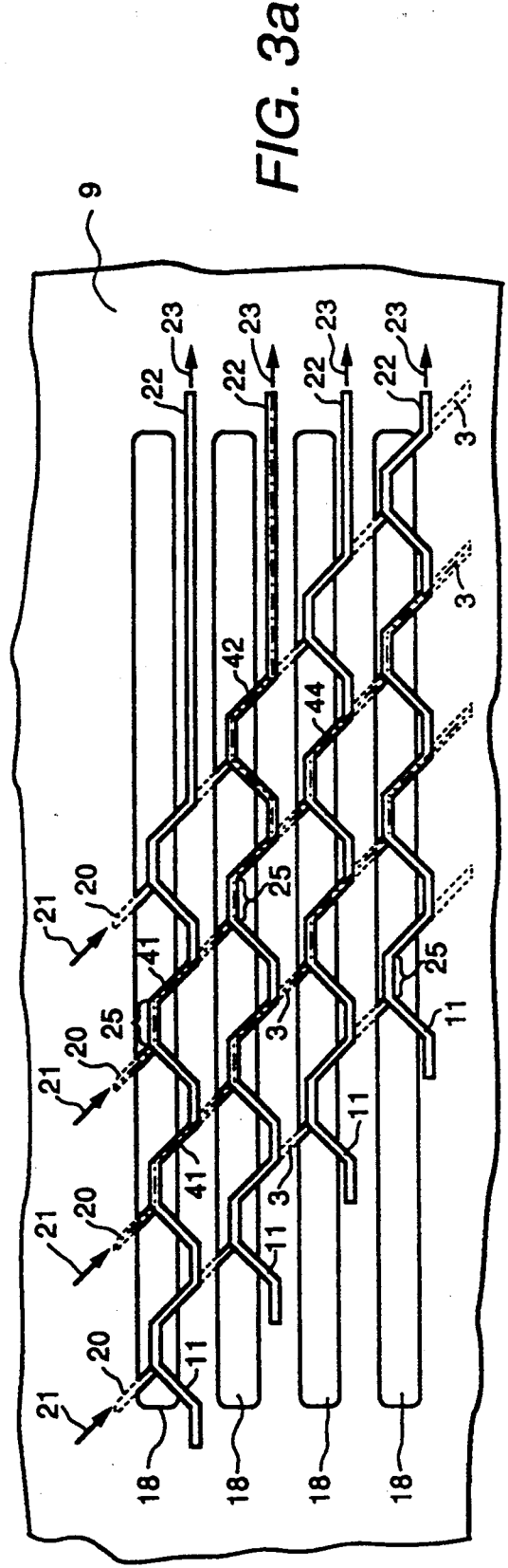
FIGS. 3a and 3b are schematic top views of two embodiments of waveguides and openings forming electromechanical photonic switching arrays.
Figure 3B:
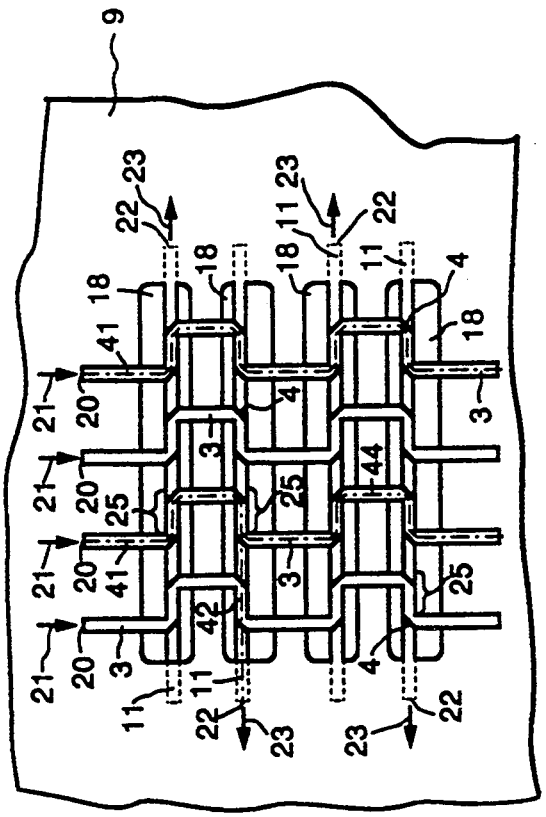

FIGS. 3a and 3b are schematic top views of first and second waveguides 3 and 11 and at least one opening 18 forming electromechanical photonic switching arrays. Each individual switch of an array operates as described with respect to the embodiments of FIGS. 1a–2b. The one or more openings 18 provide the air gaps 8 needed by the switches. The openings need not be in the shapes shown since any shape or size of opening which leaves a sufficient region for light transfer to occur is acceptable. Cross-over portions 25 are those portions of the switch where predetermined portions of first waveguides 3 are substantially parallel on one side of an opening 18 opposite predetermined portions of second waveguides 11.

The electrodes and the second cladding layer shown in FIGS. 1a–2b are omitted in FIGS. 3a–3b for clarity. Either an electrostatic or piezoelectric switch can be used with any of the arrays of the present invention, and the positions of the electrodes can either be adjacent respective waveguides or in other locations. Insulator layer 7 (shown in FIGS. 1a–1b) is present in an electrostatic switching array. The insulator layer can either be a sheet of insulative material, such as silicon dioxide, covering each of the first electrodes or a plurality of individual insulative material patches, with each of the patches covering individual electrodes at least over the mechanical contact areas.

In the embodiments of FIGS. 3a–3b, any input channel 20 can be connected to any output channel 22 so that the activated switches do not interfere with the optical paths of other channels. Because waveguide bends create losses (typically at least 0.3–0.5 dB per bend), the number of bends is preferably minimized. In each of FIGS. 3a–3b, example light paths are illustrated with phantom lines. Light path 41 represents the light entering first waveguides 3. If no switch is activated in a first waveguide, the light path remains in that waveguide. If a switch is activated, some of the light is coupled from the first waveguide to a respective second waveguide and follows light path 42 to an output channel 22, whereas the uncoupled portion of the light remains in the first waveguide along light path 44.

In the embodiment shown in FIG. 3a, first waveguides 3 are jogged and run left to fight at a 45 degree angle, whereas second waveguides 11 have a serpentine pattern running left to fight. Input light 21 is sent at input channel 20 through the first waveguides, and, when appropriate switches are activated, output light 23 is coupled out of the second waveguides through output channels 22. For a four-by-four switching matrix, the longest optical path results in a total of 21 waveguide bends, giving a worst-case optical transfer loss of >10 dB.

The array shown in the embodiment of FIG. 3b achieves a reduced number of waveguide bends by using right angle bends and by altering the switch geometry slightly. In this design, first waveguides 3 have a switch every second waveguide bend, and there are no bends on second waveguides 11, resulting in a worst-case total of 7 waveguide bends, or a worst-case insertion loss of 3–4 dB due to bends alone. Because second waveguides 11 have no bends, losses are minimized once the light is coupled. The disadvantage is the modified switch geometry, which requires higher switching voltages because of the larger restoring spring constant. In a preferred embodiment, each right angle bend has a 45 degree reflecting joint 4, preferably with a mirror (not shown), to minimize scattering light loss at the bend.

Figure 4A:
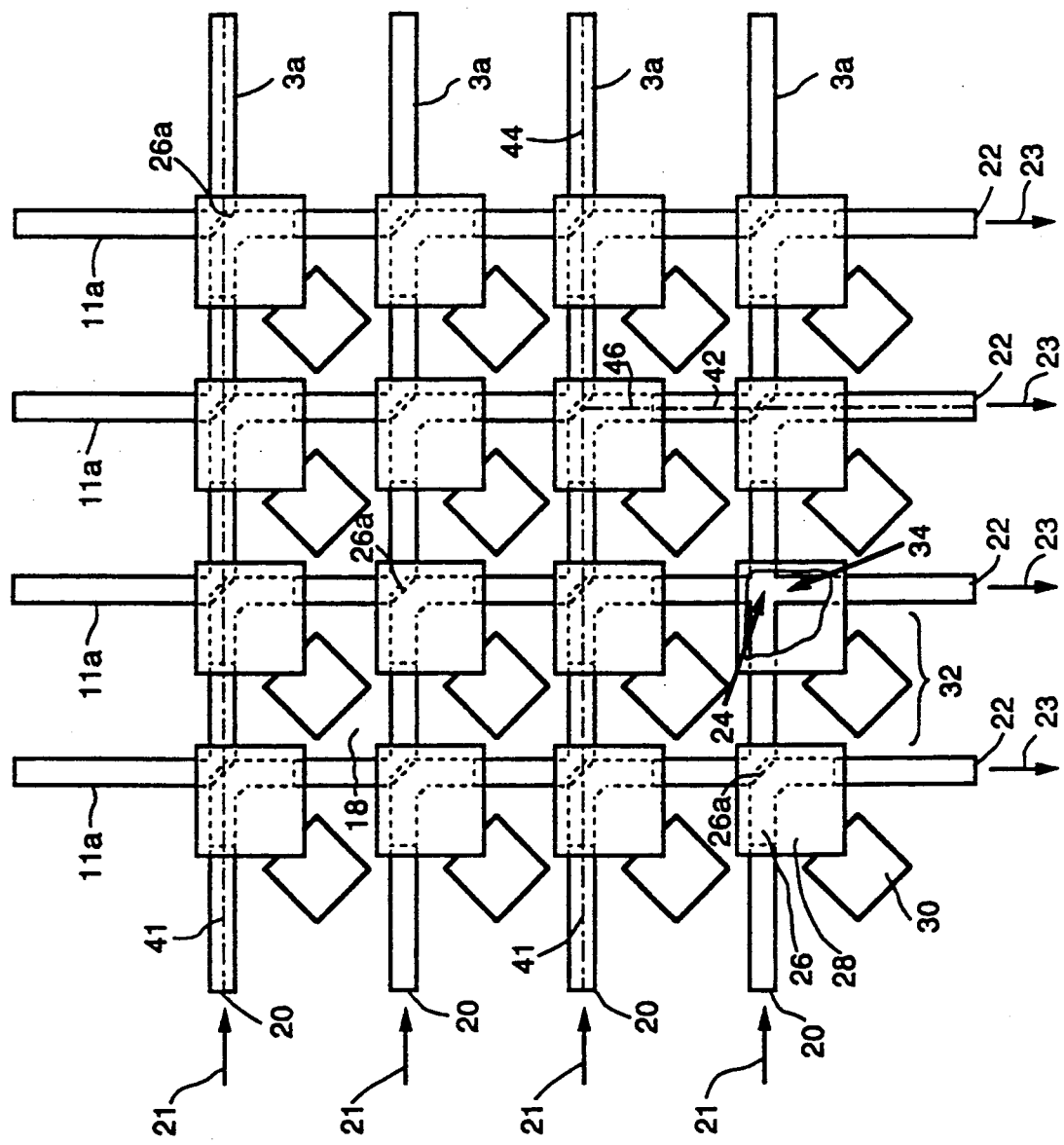
FIG. 4a is another schematic top view of waveguides and an open region forming an electromechanical photonic switching array.

The embodiment shown in FIGS. 4a–4b uses another modification of the optical switch to control coupling between a Cartesian grid of straight waveguides. The electrodes shown in FIGS. 1a–2b are omitted in FIGS. 4a–4b for clarity. Either an electrostatic or piezoelectric switch can be used with any of the arrays of the present invention, and the positions of the electrodes can either be adjacent respective waveguides, as shown in FIGS. 1a–1b, or in other locations, as shown in FIG. 2k.

The individual switches operate in a similar manner as described with respect to FIGS. 1a–2b, except that first waveguides 3a and second waveguides 11a are situated on the same plane and coupling of light from a predetermined first waveguide to a predetermined second waveguide is achieved by using a movable waveguide coupler 26 which comprises a polyimide material similar to that of the first and second waveguides and preferably has a right angle bend with a 45 degree reflecting joint, preferably with a mirror 26a.

An open region 18 has one or more openings which provide the air gaps needed by the switches. In the embodiment of FIGS. 4a–4b, one large opening is used with insulative cladding between the waveguide couplers and first and second waveguides forming pedestals 30, comprising a polyimide, for example, for supporting movable plates 28 which hold waveguide couplers 26 in place above the first and second waveguides and provide the appropriate distance between the waveguide couplers and the first and second waveguides. The pedestals can be formed, for example, by coating he substrate with a layer of polyimide material and etching the material except in the area where pedestals are desired.

First waveguides 3a and second waveguides 11a intersect at intersection points 24. The term "intersect" is intended to encompass any situation in which the waveguides intersect. In a is preferred embodiment, as shown FIG. 4a, the first and second waveguides are coplanar waveguides comprising the same layer of polyimide material in common. In other embodiments, the intersection can result from the second waveguides crossing over the first waveguides, or the first waveguides crossing over the second waveguides, or some of the second waveguides crossing over the first waveguides while others of the second waveguides are crossed over by the first waveguides.

Each respective waveguide coupler 26 is situated on the side of the movable plate facing the opening and the first and second waveguides. Each respective waveguide coupler 26 is substantially parallel on one side of an opening 18 opposite a respective predetermined portion of first waveguides 3a and a respective predetermined portion of second waveguides 11a to form a respective cross-over portion of respective first and second waveguides, shown as cross-over portion 34 in the cut-away of FIG. 4a.

When an electrostatic switch is used, first electrode 5 (shown in FIGS. 1a–2b) is situated on the same side of opening 18 as cross-over portion 34, while second electrode 6 (shown in FIGS. 1a–2b) is situated on the same side of opening 18 as waveguide coupler 26. An electrode can be between a respective waveguide and the opening, or adjacent to a respective waveguide. When a piezoelectric switch is used, the placement is similar except that the first piezoelectric electrode is placed on movable plate 28 above the opening.

The movable plates comprise a flexible material such as a polyimide with appropriate reinforcing layers to provide the desired mechanical support. One fabrication method is to apply a sacrificial layer (not shown) of material such as copper between the pedestals in a similar manner as discussed with the sacrificial layer in the well of FIGS. 1a–2b. Then waveguide couplers, respective electrodes, and the plate material can be formed in the desired order. (The order of application of the electrodes and waveguide couplers depends on whether the switch is electrostatic or piezoelectric.) A selective etch can next be done to provide individual plates from the plate material, and another etch can remove the sacrificial layer. These etches must comply with the array design and leave movable plates overhanging from the pedestals and forming flexible cantilever beams.

By bringing the waveguide coupler in close proximity with the intersection point of the two waveguides, optical coupling results. In FIG. 4a, example light paths are illustrated with phantom lines. Light path 41 represents the light entering first waveguides 3a. If no switch is activated in a first waveguide, the light path remains in that waveguide. If a switch is activated, some of the light is coupled from the first waveguide to a respective waveguide coupler 26, followed by some of the light in the respective waveguide coupler being coupled into a respective second waveguide 11a and following light path 42 to a respective output channel 22. Any uncoupled portion of the light remains in the first waveguide along light path 44.

An advantage of those over the embodiments of FIGS. 3a–3b is that it allows a larger number of nodes to be present because, although a slightly larger loss occurs at the active switching node, the loss at every inactive node is negligible. The loss for each switching node in an active state is approximately the same, instead of depending on the number of bends in a waveguide. Additional advantages of this geometry are that straight waveguides are used throughout, that a minimal (one bend, regardless of optical path chosen) insertion loss is experienced across the entire array, and that the geometry results in a simpler and more flexible switch. A substantial portion of each metal plate can be used for a respective electrode, thus increasing the switching efficiency and reducing the required drive voltages. The disadvantages of this design are that it requires two couplings per switch. The tradeoff then becomes a balance between the crossover loss and the bending loss.

While only certain preferred features of the invention have been illustrated and described herein, many modifications and changes will occur to those skilled in the art. For example, although the description has focussed primarily on electrostatic and piezoelectric waveguide bending forces, any bending actuation force can be used, including electromagnetic forces, thermal forces, fluid forces, and pneumatic forces. It is, therefore, to be understood that the appended claims are intended to cover all such modifications and changes as fall within the true spirit of the invention.

What is claimed is:

1. A microelectromechanical photonic switching array, comprising:
   a plurality of first optical waveguides;
   a plurality of second optical waveguides;

insulative cladding between the first and second pluralities of waveguides, said insulative cladding having at least one patterned opening therein and having a lower refractive index than the refractive indices of the waveguides of said first and second pluralities, wherein each one of said first waveguides is positioned with predetermined first waveguide portions on one side of said at least one opening and each one of said second waveguides is positioned with predetermined second waveguide portions substantially parallel to respective ones of said predetermined first waveguide portions on an opposing side of said at least one opening; and means for moving a selected one of said predetermined second waveguide portions closer to a respective one of said predetermined first waveguide portions in response to an actuation force.

2. The switching array of claim 1, further including a silicon substrate supporting said first and second pluralities of waveguides.

3. The switching array of claim 1, wherein one of said first and second pluralities of waveguides comprises serpentine-shaped waveguides.

4. The switching array of claim 1, wherein one of said first and second pluralities of waveguides comprises substantially straight waveguides and the other of said pluralities of first and second waveguides comprises waveguides having bends therein of about ninety degrees.

5. The switching array of claim 4, wherein each respective bend of about ninety degrees includes a reflective joint at about a forty-five degree angle with respect to each of the waveguide portions of said respective bend.

6. The switching array of claim 1, wherein said means for moving comprises:
a plurality of first electrodes, each of said first electrodes being situated on a respective portion of said one side of said at least one opening;
an insulator layer situated between each of said first electrodes and each respective portion of said at least one opening; and
a plurality of second electrodes, each of said second electrodes being situated on a respective portion of said opposing side of said at least one opening.

7. The switching array of claim 6, wherein the waveguides of said first and second pluralities are comprised of a polyimide material and wherein said first and second electrodes are comprised of a material which is at least partially transparent.

8. The switching array of claim 7, wherein said insulator layer comprises silicon dioxide.

9. The switching array of claim 1, wherein said means for moving comprises:
a first cladding layer facing the plurality of said first waveguides and said insulative cladding, said first cladding layer having a lower refractive index than that of the waveguides of said first plurality;
a second cladding layer facing the plurality of said second waveguides and said insulative cladding, said second cladding layer having a lower refractive index than the waveguides of said second plurality;
a plurality of first electrodes, each of said first electrodes being situated over a portion of said second cladding layer situated above a respective portion of said at least one opening;
a plurality of piezoelectric strip lines, each of said piezoelectric strip lines being situated between a respective first electrode and said first cladding layer; and
a plurality of second electrodes, each of said second electrodes being situated between a respective portion of said second cladding layer and a respective portion of said at least one opening.

10. The switching array of claim 9, wherein the waveguides of said first and second pluralities are comprised of a polyimide material, said second electrodes are comprised of a material which is at least partially transparent, and said first electrodes are selected from the group consisting of of aluminum, platinum, and chromium.

11. The switching array of claim 10, wherein said first and second cladding layers are comprised of a polyimide and wherein said piezoelectric strip lines are comprised of lead zirconate titanate.

12. A microelectromechanical photonic switching array, comprising:
a plurality of first optical waveguides;
a plurality of second optical waveguides, each of said second waveguides intersecting respective portions of each of said first waveguides at respective intersection points;
a plurality of waveguide couplers, each of said waveguide couplers having one waveguide coupler portion situated substantially parallel to a first coupler portion of a respective one of said first waveguides and another waveguide coupler portion situated substantially parallel to a second coupler portion of a respective one of said second waveguides, said first and second coupler portions forming cross-over portions;
means for distancing said waveguide couplers and the first and second pluralities of waveguides, said means for distancing including at least one patterned opening therein, wherein each one of said cross-over portions is situated on one side of said at least one opening and each one of said waveguide couplers is situated on an opposing side of said at least one opening; and
means for moving a predetermined one of said plurality of waveguide couplers closer to a respective intersection point in response to a force of the group consisting of electrostatically-generated and piezoelectrically-generated forces.

13. The switching array of claim 12, wherein each of said waveguide couplers includes a bend of approximately ninety degrees and each of said bends includes a reflective joint at about a forty-five degree angle with respect to each of the waveguide portions of said respective bend.

14. The switching array of claim 12, wherein said means for moving comprises:
a plurality of first electrodes, each of said first electrodes being situated on a respective portion of said one side of said at least one opening; and
a plurality of second electrodes, each of said second electrodes being situated on a respective portion of said opposing side of said at least one opening.

15. The switching array of claim 14, further including an insulator layer situated between each of said first electrodes and each one of said respective portions of said one side of said at least one opening.

16. The switching array of claim 15, wherein said waveguide couplers and the waveguides of said first and second pluralities are comprised of a polyimide material and wherein said first and second electrodes are comprised of material which is at least partially transparent.

17. The switching array of claim 16, wherein said insulator layer comprises silicon dioxide.

18. The switching array of claim 12, wherein said means for moving comprises:
- a first cladding layer facing said first and second waveguides and said at least one opening, said first cladding layer having a lower refractive index than that of the waveguides of said first and second pluralities;
- a plurality of movable plates, each of said movable plates facing a respective waveguide coupler and said at least one opening and having a lower refractive index than that of said respective waveguide coupler;
- a plurality of first electrodes, each of said first electrodes being situated over a portion of a respective one of said movable plates situated above a respective portion of said at least one opening; and
- a plurality of second electrodes, each of said second electrodes being situated between said first cladding layer and a respective portion of said at least one opening.

19. The switching array of claim 18, further including a plurality of piezoelectric strip lines, each of said piezoelectric strip lines being situated between a respective one of said first electrodes and a respective one of said movable plates.

20. The switching array of claim 19, wherein each of said first, second, and waveguide couplers comprises a polyimide material, said first electrode comprises aluminum, and said second electrode comprises material which is at least partially transparent.

21. The switching array of claim 20, wherein said piezoelectric strip lines comprise lead zirconate titanate.

* * * * *